United States Patent
Putkowski

[15] 3,677,682
[45] July 18, 1972

[54] HOT RUNNER SYSTEM

[72] Inventor: Ladislao (Wladyslaw) Putkowski, 21 Limarick Ave., Weston, Ontario, Canada

[22] Filed: March 9, 1970

[21] Appl. No.: 17,846

[52] U.S. Cl. .............................. 425/192, 425/243, 425/244
[51] Int. Cl. ....................................................... B29f 1/00
[58] Field of Search ............ 18/30 JT, 30 HB, 30 RM, 30 RC, 18/30 RH, 30 RP, 30 RV

[56] References Cited

UNITED STATES PATENTS

| | | | |
|---|---|---|---|
| 3,488,810 | 1/1970 | Gellert | 18/30 RV X |
| 3,091,812 | 6/1963 | Witkowski | 18/30 RH X |
| 3,537,139 | 11/1970 | Segmuller | 18/30 RH |

Primary Examiner—H. A. Kilby, Jr.
Attorney—Rogers, Bereskin & Parr

[57] ABSTRACT

An L-shaped hot runner tube for plastic injection molds. The tube inlet and outlet slide snugly in bores in a sprue bushing and cavity plate respectively, so that as the runner expands and contracts, its ends can move. The tube ends can be sealed by a sleeve seal having a portion overlying the tube and of less diameter than the bore, and having a projecting portion of diameter slightly greater than that of the bore, enabling a good seal while reducing heat flow from the hot runner. Semi cylindrical heaters can be clamped to the sides of the tube and are removable without disassembling the ends of the tube.

A stem member is slidably fitted into the tube discharge end with its tip projecting into a gate in the cavity plate, to control flow. The stem member can be externally driven as a valve, or it can be biased to closed position and forced open by plastic pressure when the pressure becomes sufficiently high.

31 Claims, 18 Drawing Figures

Patented July 18, 1972
3,677,682
3 Sheets-Sheet 1
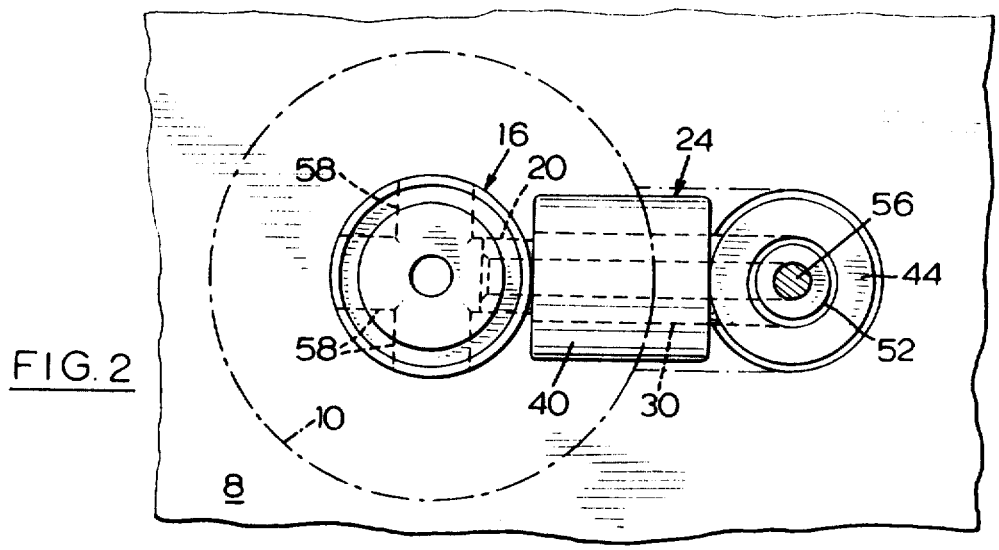
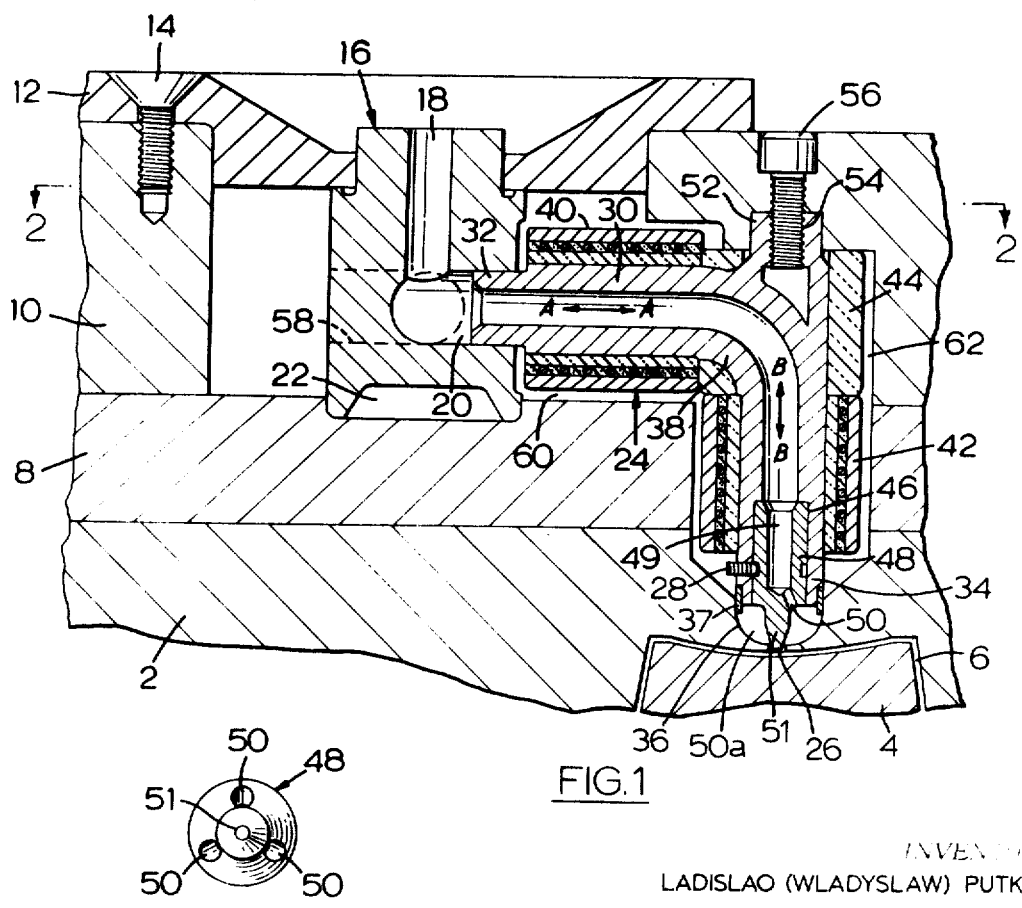
INVENTOR
LADISLAO (WLADYSLAW) PUTKOWSKI
BY
Rogers, Bereskin, & Parr

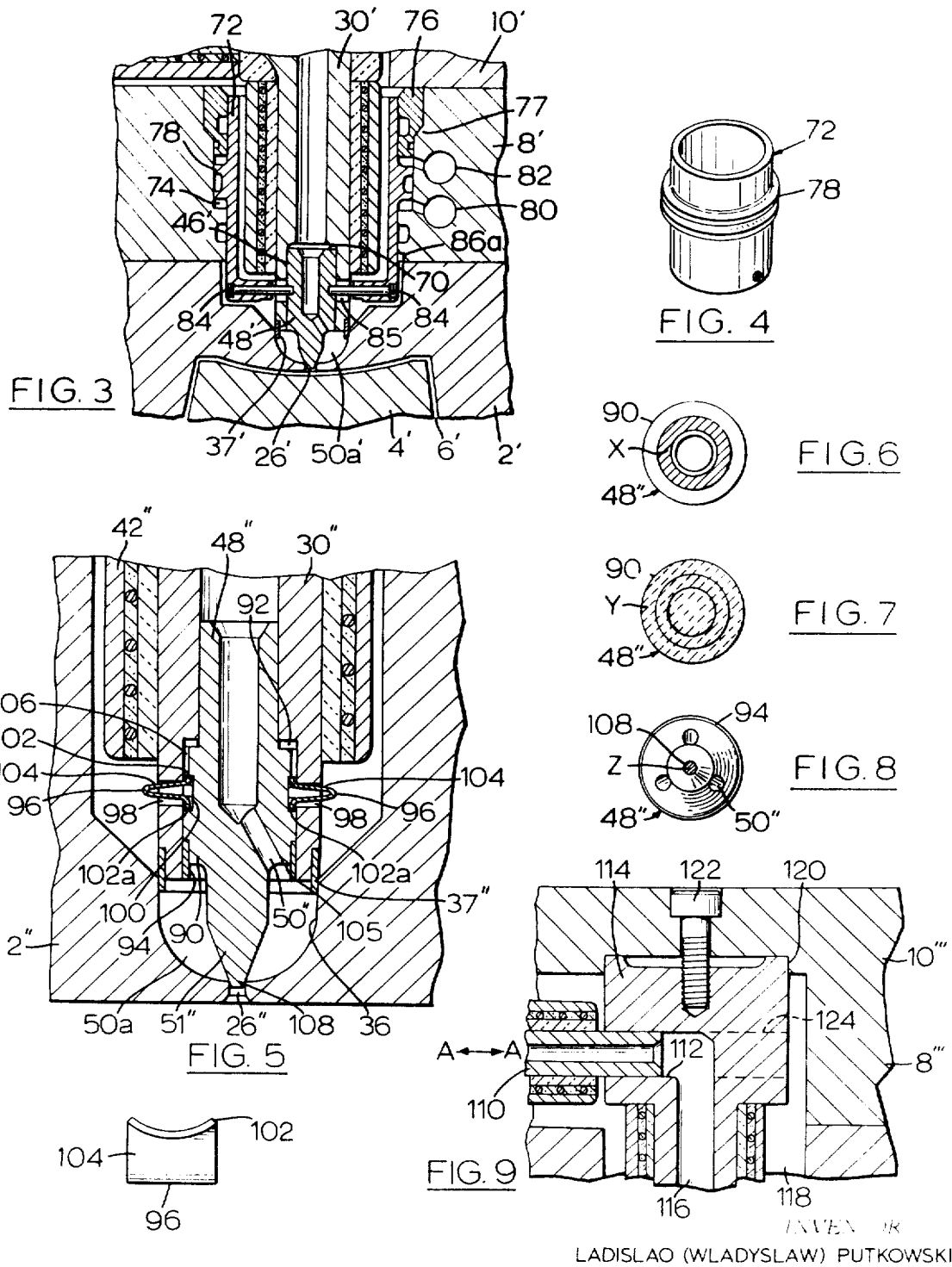

Patented July 18, 1972

INVENTOR
LADISLAO (WLADYSLAW) PUTKOWSKI

BY Rogers, Bereskin, & Parr

HOT RUNNER SYSTEM

This invention relates to an improved hot runner system for plastic injection molds.

In the art of injection molding, molten plastic is usually supplied under high pressure by an injection molding machine to a mold structure, where it is received by a sprue bushing. From the sprue bushing, the plastic is commonly conducted by conduits called runners to nozzles leading into various mold cavities (or to different parts of the same cavity). The runners are often heated, in which case they are called hot runners. When the plastic finally enters the mold cavity it freezes to form a desired part. To ensure rapid freezing, the mold structure is usually water cooled in the vicinity of the cavity.

Difficulties have been experienced in the past with hot runner systems for the following reason. In the past, the hot runners were usually formed by channels machined in a large block located next to the mold cavity plate. The temperature differential between the hot runner block and the relatively cold mold plate caused the block to expand to a greater extent than the plate, and this tended to cause tilting of the nozzles (usually firmly located in the hot runner block to avoid leakage) directing plastic into the mold cavity. Since the opening through which a nozzle discharges into the mold cavity is very small and must be precisely aligned, tilting of the nozzle often leads to improper operation.

Accordingly, it is an object of this invention in one of its aspects to provide a simple hot runner system which reduces the effects of differential expansion. To this end, the invention provides for a plastic injection mold structure, a hot runner system comprising: a first member adapted to be located in said mold structure, said first member having a first bore therein; a second member adapted to be located in said mold structure at a position spaced from said first member, a runner member for conducting molten plastic between said first and second members, said runner member having a tubular first end adapted to be snugly but slidably fitted into said first bore and a second end adapted to be connected to said second member, said first end of said runner member being slidable relative to the inner end of said first bore, and a heater coupled to said runner member between said ends to heat said plastic flowing through said runner member, said runner member comprising a pair of runner portions oriented at right angles to each other and joined by an integral right angle bend.

In another of its aspects the invention provides a sleeve seal for a hot runner, so that the hot runner can be slidably inserted into a bore with a good seal and with reduced heat transfer between the hot runner and the wall of the bore.

In still another of its aspects, the invention provides, in a preferred embodiment, a semi-cylindrical heater that can be applied to the side of a hot runner tube without disassembling the ends of the hot runner tube.

In yet another of its aspects, the invention provides a valve operated by the pressure of the plastic passing therethrough, so that when the pressure is increased beyond a predetermined valve, the valve will open.

Further objects and advantages of the invention will appear from the following disclosure, taken together with the accompanying drawings, in which:

FIG. 1 is a sectional view showing a sprue bushing and hot runner in position on a cavity plate;

FIG. 1A is a bottom plan view of a stem member of FIG. 1;

FIG. 2 is a section along lines 2—2 of FIG. 1 with a front plate removed and with a spacer plate shown only in dotted outline;

FIG. 3 is a sectional view showing a portion of a modified hot runner in position on a cavity plate arranged to operate as an externally operated valve;

FIG. 4 is a perspective view of a piston of FIG. 3;

FIG. 5 is a view similar to FIG. 3 showing a plastic pressure operated valve;

FIG. 5A is a plan view of a spring used in the valve of FIG. 5;

FIGS. 6 and 7 are top plan views of a stem shown in FIG. 5;

FIG. 8 is a bottom plan view of the stem of FIG. 5;

FIG. 9 is a sectional view of a further embodiment of the invention;

Figure 10:
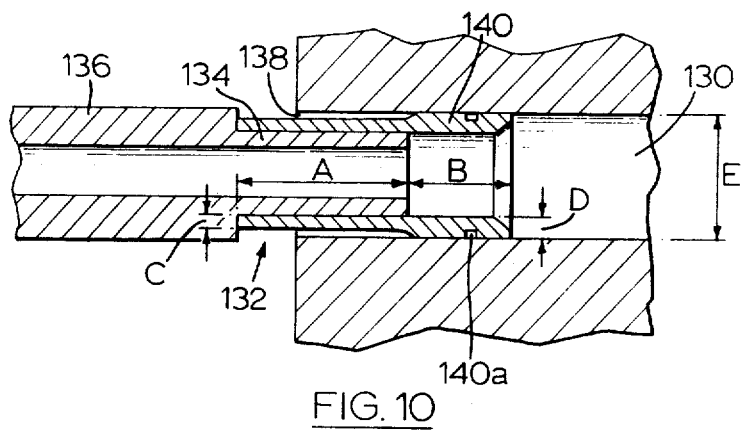
FIG. 10 is a sectional view showing the end of a hot runner tubing slidably inserted in a bore and showing a new type of seal.

Reference is first made to FIGS. 1 and 2 and particularly FIG. 1, where there is shown a mold cavity plate 2 forming with another plate 4 a cavity 6 into which molten plastic is to be injected to form a desired part. Cooling channels (not shown) are provided in the cavity plate 2 to permit flow of cooling water therethrough. Connected to the cavity plate 2 are three further plates, namely a rear plate 8, a spacer plate 10 (shown in dotted outline in FIG. 2), and a front plate 12. The rear plate 8 and spacer plate 10 are fastened together and to the cavity plate by screws (now shown), and the front plate 12 is fastened to the spacer plate 10 by screws 14.

The front plate 12 serves to clamp in position a sprue bushing generally indicated at 16. The sprue bushing 16 receives molten plastic from an injection molding machine (not shown) by way of a central axial channel 18, and then directs this plastic outwardly through a radial bore 20. A relieved portion 22 at the bottom of the sprue bushing 16 reduces heat transfer from the hot sprue bushing through rear plate 8 to the cool cavity plate 2.

From the sprue bushing 16, the molten plastic travels through a hot runner generally indicated at 24 and is then injected through a gate (i.e., an outlet aperture) 26 in the cavity plate 2 and then passes into the mold cavity 6.

The hot runner 24 comprises a tubular member 30 having a first end 32 snugly but slidably fitted into the bore 20 in the sprue bushing, and a second end 34 snugly but slidably fitted into a bore 36 in the cavity plate 2. The end 34 of the hot runner tubing 30 includes a sealing sleeve 37 (of the kind described later in connection with FIG. 10) which forms a seal between the hot runner and the wall of the bore 36. (The seal between the first end 32 of the hot runner tubing and the sprue bushing bore 20 is formed simply by the snug fit between these parts.)

Because the axes of the bores 20, 36 are oriented in the same plane but at right angles to each other, the tubular member 30 has a right angle bend indicated at 38 in its center, so that it is shaped generally in the form of a letter L.

Plastic flowing through the tubular member 30 is maintained at desired temperature by a pair of heaters 40, 42 which encircle the tubular member 30 on each side of the bend 38. The heaters, 40, 42 are coveniently made by selecting a ceramic tube of a diameter of fit over member 30, winding a heater wire around the ceramic tube, placing the resulting combination in a metal sleeve, and injecting an appropriate bonding material or cement between the ceramic tube and metal sleeve. Between the heaters 40, 42 there is located a bushing 44 of insulating material such as ceramic.

The inner diameter of the outlet end of the tubular member 30 is enlarged as shown at 46 to accomodate a stem 48. The stem 48 is press fitted into the end of the tubular member 30 before the tubular member 30 is slid into the bore in the cavity plate 2. The stem 48 is locked in place in the tubular member 30 by a set screw 28 which extends through the wall of tubular member 30 and into a circumferential grove in the outer wall of the stem 48.

The stem 48 has an axial interior bore 49 and three spaced outlet passages 50. The passages 50 direct plastic into a chamber 50a defined by the wall of the bore 36, the end 34 of the hot runner tubing 30, and the stem 48. From the chamber 50a the plastic flows into the gate 26. A reduced diameter tip 51 of the stem 48 penetrates into the gate 26 but is spaced from the walls of the gate by a few thousandths of an inch to allow plastic to pass through the gate into the mold cavity 6.

The arrangement shown, by which the molten plastic is directed through spaced passages in the stem 48, into the top of the chamber 50a, keeps the plastic in space 50a flowing and prevents plastic stagnation or freezing. The stem 48 is preferably made of a better heat conductor material (e.g., berillium copper) than that of the tubular member 30, to conduct heat to the plastic flowing through the gate 26 to prevent freezing in the gate. The total sectional area of passages 50 is approximately equal to that of bore 49.

The hot runner 24 further includes a short upper tube 52 welded to the bend 38 of the tubular member 30. The tube 52 contains a threaded bore 54 to receive a bolt 56 which holds the hot runner in position relative to the spacer plate 10.

It will be noted that the left hand end 32 of the tubular member 30 is spaced from the inner end of the bore 20 in the sprue bushing 16. This allows the hot runner to expand in the direction of arrows A—A as the hot runner is heated, without tending to tilt the axis of the bore 36 or the stem 48 relative to the cavity plates 2, 4. The amount of room needed to allow for lengthwise expansion of the tubular member 30 in the direction of arrows A—A is fairly small. For example, if the member 30 is stainless steel and is 4 inches long in the direction of arrows A—A (this is a typical length), then it will expand approximately only twenty-thousandths of an inch during heating to operating temperature. However, if the expansion room described were not provided, then differential expansion between tubular member 30 and cavity plate 2, even though slight, could cause misalignment of the bore 36 and stem 48 and would cause difficulty in molding. The spacing between the end of the tube 30 and the inner end of bore 20 is sufficient to allow for the maximum expected expansion of tubular member 30.

Tubular member 30 is preferably made of a material having a greater thermal coefficient of expansion than the material of the sprue bushing 16. For example, tubular member 30 can as indicated be made of stainless steel, while the sprue bushing can be made of tool steel. This permits easy assembly of the parts while they are cool, with a snug but slidable fit when they are hot.

Similar provision for expansion in the direction of arrows B—B is made at the other end 34 of the tubular member 30, because of the sliding fit between the end 34 and the cavity plate 2.

Although the sprue bushing 16 has been shown as having only one bore 20, it can be provided with a number of radial bores as indicated in dotted lines at 58, to feed other hot runners. The hot runners may be made in various lengths as required.

It will be noted that the hot runner 24 is largely separated from the rear plate 8 by air gaps 60, 62. In fact, the hot runner contacts the plates 8, 10 and the cold mold plates only at three points, i.e., at the sprue bushing, the tip of the upper tube 52, and at the seal between the end 34 and the cavity plate 2. This reduces heat transfer from the runner to rear plate 8 and hence to the cavity plate, and yet the hot runner is securely held in position.

Reference is next made to FIG. 3, which shows an arrangement similar to the FIGS. 1 and 2 embodiment, and wherein primed reference numerals indicate parts corresponding to those of FIGS. 1 and 2. The FIG. 3 embodiment differs from the FIGS. 1 and 2 embodiment in that the stem 48' is made movable and is powered externally, so that the gate 26' can be opened and closed as desired. To this end, the bore 46' in the tip of the tubular member 30' is made of diameter such that the stem 48' can slide snugly but smoothly therein, and the bore 46' is made long enough so that there is a clearance 70 between the upper end of the stem 48' and the upper end of the bore 46' when the stem 48' is in its lowermost position. When the stem 48' is in its lowermost position, it completely blocks and closes the gate 26', and when the stem 48' is raised, plastic is permitted to flow through the gate. A typical stroke for the stem 48' is 0.020 inches.

The stem 48' is driven by a piston 72 (see FIG. 4) snugly fitted within a cooperating cylinder 74 formed in the rear plate 8'. The piston 72 is inserted from the top of the rear plate and is held in position by an insert 76. The insert 76 is held against a shoulder 77 of the rear plate 8' by the pressure of the spacer plate 10'. The piston 72 includes a central flange or ring 78, so that air may be introduced to the bottom of the flange 78 via an aperture 80 in the rear plate to drive the piston upwardly, or alternatively, air may be introduced to the top of the flange 78 via an aperture 82 to drive the piston downwardly.

The piston 72 is connected to the stem 48' by two pins 84 which extend through holes 85 in the tip of tubular member 30' and are screwed into the piston 72. Plastic does not normally escape through the holes 85 because of the tight sliding fit between the stem 48' and the interior wall of the tip of member 30'. However, after the tight sliding fit between stem 48' and the interior wall of the tip of member 30' becomes loosened by wear, a small amount of plastic will escape through the holes 85. This plastic is directed to the outside of the mold through drain passages 86a in the rear plate 8' leading to the bottom of the mold structure. The escaping plastic provides a visual indication that wear of the parts has occurred.

Reference is next made to FIG. 5, in which double primed reference numerals indicate parts corresponding to those of FIGS. 1 and 2. The FIG. 5 embodiment is similar to that of FIG. 3 in that the stem 48'' is movable, but the stem 48'' is now fitted with an enlarged diameter collar 90 which slides snugly within an enlarged bore 92 in the end of hot runner tubing 30''. A flexible sleeve seal 94 (also of the type to be described in connection with FIG. 10) seals the collar 90 against the walls of the bore 92 to prevent leakage. The lower end 105 of the collar forms part of the seal for the chamber 50a''.

Instead of being moved by a piston, the stem 48'' is biased to closed position by a pair of flat springs 96, also shown in FIG. 5A. The springs 96 are inserted through a pair of opposed slots 98 in the walls of the hot runner tubing 30'' and engage in a circumferential groove 100 in the collar 90 of the stem 48''. The springs 96 are U shaped in cross section, with end tabs 102 which extend outwardly under the edges of the slots 98 to retain the springs 96 in position.

As shown, the tabs 102a nearest the chamber 50a' press against the lower wall of the groove 100 to urge the stem downwardly. The upper walls 104 of the springs press against the walls of the slots 98 in the hot runner tubing. The upper tabs 102 of the springs 96 are spaced from the upper wall of the groove 100 to permit downward movement of the stem 48''. Venting slots 106 are provided to permit escape of air in the upper part of the bore 92 as the stem moves up and down.

In operation, the springs 96 normally force the tip 51'' of the stem 48'' into the gate 26 to close the gate. Plastic, when injected, passes through the openings 50'' into the chamber 50a'', where the pressure tends to force the stem 48'' upwardly. The stem 48'' will be forced upwardly when the pressure of the plastic becomes high enough, and will then permit plastic to pass through the gate 26'' into the mold cavity 6''.

The pressure at which the stem 48'' will move upwardly can be roughly calculated as follows. Assume that the cross-sectional area of the top of the stem 48'' is X, as indicated by the shaded area in FIG. 6, the cross-sectional area of the stem at the bottom surface 105 of the collar 90 is Y, as indicated by the shaded area in FIG. 7, and the cross-sectional area of the normally closed extreme tip 108 of the stem is Z, as indicated by the shaded area in FIG. 8.

Then, when the valve is closed, the plastic presses down on area X and up on area Y-Z (since tip Z lies against the gate 26'' and is not acted on by the plastic) and the plastic pressure required to open the valve is $$\frac{\text{spring pressure } 96}{\text{area } Y - (\text{area } X + \text{area } Z)}$$

Once the valve is open, the plastic presses down on area $X$ and up on area $Y$ and the pressure required to hold the valve open is $$\frac{\text{spring pressure 96}}{\text{area } Y - \text{area } X}$$

By way of example, if the areas are $Y = 0.1503$ square inches, $X = 0.0767$ square inches, $Z = 0.0048$ square inches, and spring pressure 96 is 30 pounds, then (a) valve opening pressure is 447 psi, (b) pressure to hold valve open is 410 psi, and (c) valve closing pressure is spring pressure area $Z$, which is 6,000 psi, with no plastic pressure.

It will be noted that the springs 96 shown in the FIG. 5 embodiment are cheap, and since they are located in an air space, they are exposed to less heat than would be the case if a coil spring located between the stem 48″ and the hot runner tubing 30″ were used. It will be seen that the springs 96 not only provide spring action, but also they constitute retaining means to hold stem 48″ in position, and further they form a stop which prevents the heater 42″ from being moved too far downwardly.

It will be appreciated that the valves of FIGS. 3 and 5 can if desired be used in injection molding machines as machine nozzles, i.e., to turn the flow of plastic on and off after the plastic has been injected. For the spring operated valve, the valve opening pressure can be controlled simply by varying the pressure of springs 96 and by changing the relation of areas $X$ and $Y$.

Although the hot runner 24 has been shown as comprising an L-shaped tubular member 30, it can instead (see FIG. 9) be formed from a straight tubular section 110 extending in the direction of arrows A—A and fitted into a bore 112 in a nozzle 114. The tubular section 110 corresponds to and is similar to the horizontal leg of the hot runner 24 and extends into the sprue bushing, preferably with a snug sliding fit. The tubular section 110 is of course also snugly but slidably fitted into the bore 112 in the nozzle 114.

The nozzle 114 is simply a generally cylindrical member encircled by a heater and having an axial passage 116 to direct plastic towards the mold cavity. Nozzle 114 corresponds to the vertical leg of the hot runner 24 and includes at its tip a stem (not shown) similar to stem 48 which protrudes through a chamber like chamber 50a in the cavity plate and into a gate opening (not shown) in the cavity plate. The nozzle 114 is fitted into a bore 118 in the rear plate 8‴ and a bore 120 in the spacer plate 10‴ and is held in place by a screw 122 projecting through plate 10‴. If desired, additional bores 124 can be provided in the nozzle 114 to feed plastic to additional hot runners.

Although the hot runner tubular sections and the bores in which they are fitted have been shown as extending either parallel to or at right angles to the plates of the cavity plane 2 and rear and spacer plates 8, 10, they could be directed at any angle to these plates, so long as they are slidably connected at least at one end to allow for lengthwise expansion. The invention can be used for a small single cavity mold, in which case only one straight hot runner section will be provided (either simple or valved), corresponding to the vertical leg of hot runner 24 of FIG. 1 but with a straight-through bore.

Reference is next made to FIG. 10 which shows a further seal for use on the end of a hot runner which is to be slidably fitted into a bore. Such a bore is shown at 130 in FIG. 10, the bore 130 typically being located in a sprue bushing such as that shown at 16 in FIG. 1, or in a cavity plate such as that shown at 2, 2′ or 2″ in FIGS. 1, 3 and 5 respectively.

The seal in FIG. 10 is formed by a generally cylindrical sleeve 132 overlying a reduced diameter end 134 of a hot runner tube 136 and projecting beyond the reduced diameter portion 134. The part of the sleeve 132 which overlies the end 134 of the hot runner tube is of a diameter slightly less than that of the bore 130, leaving a clearance 138 between the two. The projecting portion 140 of the sleeve 132 is of diameter the same as or very slightly larger than that of the bore 130 (e.g., 0.000 to 0.002 inches oversize when the parts are cold), to produce a snug but slidable fit. The sleeve 132 is of thin hardened flexible stainless steel so that the projecting portion 140 of the sleeve can flex when inserted into a bore.

Since the material of the sleeve is normally different from that of the hot runner 136 (the hot runner 136 will normally be tool steel or conventional stainless steel), the sleeve 132 is normally joined to the hot runner 136 by silver soldering.

When plastic is injected through the apparatus shown in FIG. 10, the seal between the portion 140 of the sleeve 132 and the walls of the bore 130 is sufficient to prevent leakage and to allow the plastic pressure to increase. As the plastic pressure increases, it forces the walls of the projecting portion 140 against the walls of the bore 130 and improves the seal. If desired, the exterior surface of the sleeve portion 140 can include a circumferential grove 140a which traps plastic and helps to improve the seal.

An important advantage of the seal shown in FIG. 10 is that it provides a good seal, and yet the area of contact between the hot runner and the wall of the bore is relatively small, thus reducing heat transfer from the hot runner to the bore. A further advantage is that if the sleeve 132 is damaged, it can be removed and a new sleeve applied to the hot runner 136.

Typical dimensions for the seal shown in FIG. 10 are as follows:

| | | Dimension (inches) |
|---|---|---|
| A | (lengths of sleeve portion overlying hot runner) | 3/16 |
| B | (length of sleeve portion 140) | 1/8 |
| C | (Thickness of sleeve portion overlying hot runner) | .025 |
| | Clearance 138 | .005 |
| D | (Thickness of sleeve portion 140) | 0.25 |
| E | (Diameter of bore 130) | ½ |

Figure 11:
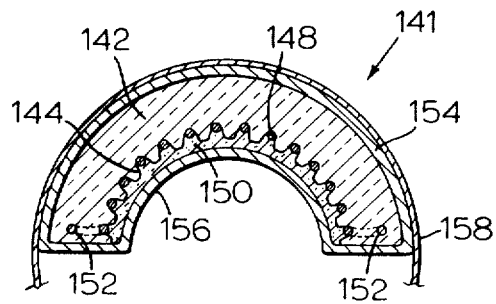
FIG. 11 is a sectional view of a heater according to the invention.
Figure 12:
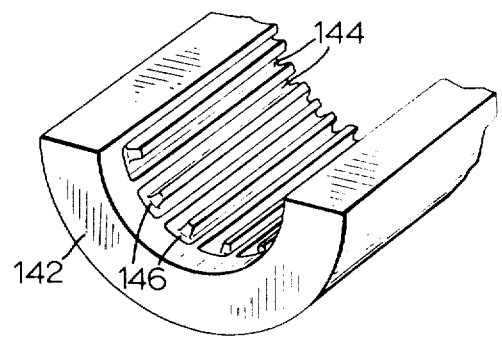
FIG. 12 is a perspective view of a portion of a ceramic core of the heater of FIG. 11.

Reference is next made to FIG. 11 which shows an alternative heater 141 for a hot runner. The heater 141 consists of generally semi-cylindrical core 142 of low thermal conductivity (see also FIG. 12) having a number of longitudinal grooves 144 extending along its inner or concave surface. Adjacent pairs of grooves are joined at their ends by cross-grooves 146. An electrical resistance wire 148 is embedded in the grooves 144 and follows a serpentine path back and forth through the grooves, crossing between the grooves at the cross-grooves 146. The resistance wire 148 is held in place by high thermal conductivity ceramic cement 150 which also forms a layer approximately 0.050 inches thick above the tops of the grooves 144. The ends of the resistance wire 148 are connected to lead wires 152 which are brought out to a suitable power source. The core and resistance wires are enclosed in a metal external shell 154.

The inside surface 156 of the sheel 154 is semi-circular in cross section, with a radius such that it fits snugly over hot runner tubing such as the tubing 136 of FIG. 10. In order to provide approximately the same insulation around the entire circumference of the hot runner tubing, another heater similar to heater 141 is used as a spare, not connected. The two semi-cylindrical heaters are placed over the hot runner tubing and clamped in place using any suitable conventional clamps, such as metal straps diagrammatically indicated at 158.

The spare heater used as insulation for the hot runner tube need not contain a heater wire 148.

Heaters such as that shown at 141 can be made very cheaply while maintaining high accuracy so that the heaters fit the hot runner tubes closely, to ensure maximum heat transfer. In addition, since the heaters are semi-cylindrical, they can be applied to and removed from the hot runner tubes (in order to exchange burned out heaters) without disassembling the hot runner tubes. In addition, if the spare heater contains an element, then its element can be connected after that of the operating heater has burned out, thus extending the time between replacement of heater parts.

Although the heaters have been shown as semi-cylindrical, they could extend around a lesser arc, e.g., 90°, so that four heaters would be required instead of two to enclose a hot runner tube. However, a semi-cylindrical form is preferred. The heaters should not extend around an arc of substantially more than 180° because they could not then be applied to the sides of the hot runner tubes but instead would have to be slide over the ends of the hot runner tubes, thus necessitating disassembly of the hot runner tubes for heater installation.

Figure 12A:
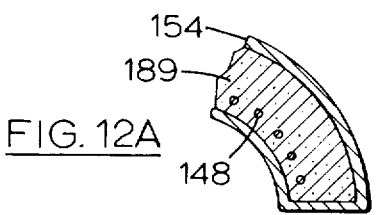
FIG. 12a is a sectional view of a modified heater.

The heater core 142 can if desired by eliminated. In that case the heater wire 148 is simply wound in a jig and is then located in a mold of size very slightly smaller than the inside size of metal shell 154. The mold is then filled with high thermal conductivity ceramic cement 189 (FIG. 12A) which is allowed partially to dry. (The cement is typically a ceramic powder, e.g., fused magnesium oxide powder, mixed with a small amount of water.) While semi-dry, the assembly is next carefully removed from the mold (since it is relatively weak) and placed in the metal shell 154. The shell 154 is then compressed slightly to compress it onto the ceramic cement and to compress the cement. This results in an inexpensive and accurately made heater. The heater wire can of course be wound in any desired configuration.

Figure 13:
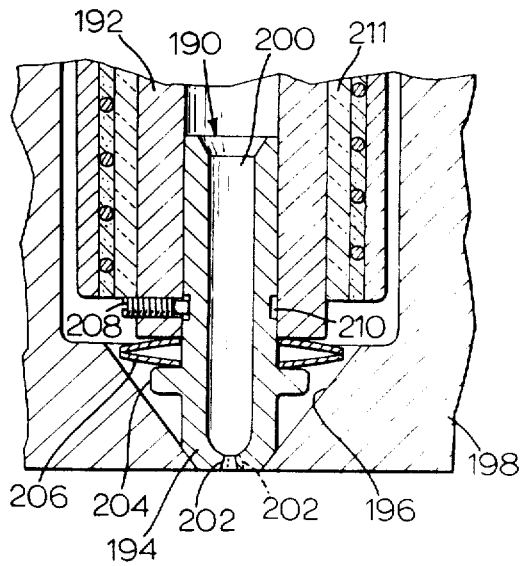
FIG. 13 is a sectional view of a slidable gate insert member and associated structure according to the invention.

Reference is next made to FIG. 13 which shows a simplified arrangement for a gate. In the FIG. 13 arrangement, a stem member or gate insert 190 is slidably housed in the bore of a hot runner tube 192 and has a conical tip 194 which fits into a conical aperture 196 in a mold cavity plate 198. The gate insert 190 has an axial bore 200 terminating in a gate aperture 202, to direct plastic into a mold cavity defined in part by the cavity plate 198.

The portion of the gate insert 190 projecting from the hot runner tube 192 includes a circumferential collar 204. A circular disk spring 206 thrusts against the tip of the hot runner tubing 192 and against the collar 204 to force the gate insert 190 downwardly against the mold cavity plate 198 to hold it in position.

The apparatus shown in FIG. 13 is assembled by inserting the insert 190 through the central hole in the disk spring 206 to bring the disk spring up against the collar 204, and then inserting the insert 190 into the hot runner tubing 192 to compress the disk spring. The insert 190 is retained in position by a set screw 208 which is threadably inserted into the wall of the hot runner tubing 192 and has a tip which engages in a circumferential groove 210 in the insert 190. The groove 210 is wider than the tip of the set screw, to allow slight motion of the hot runner tubing relative to the gate insert.

With the arrangement shown, the disk spring 206 holds the gate insert 190 in place and at the same time absorbs heat expansion of the hot runner tube. The set screw 208, in addition to retaining the gate insert in place, also serves to locate the end of the heater 211 which encircles the hot runner tubing.

An additional feature of the FIG. 13 arrangement is that if the gate aperture 202 is positioned slightly off the axis of the gate insert 190 as indicated at 202', then gate insert 190 can be rotated to bring the gate aperture 202 to optimum position depending on the article being molded. This is most useful when the wall thickness of the article being molded is not uniform and it is desirable to have more plastic flow to one location than another.

Figure 14:
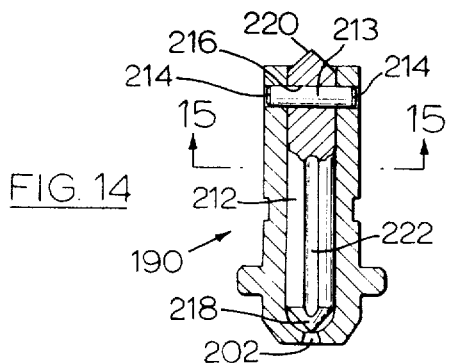
FIG. 14 is a sectional view of the gate insert member of FIG. 13, with a torpedo in place therein.
Figure 15:
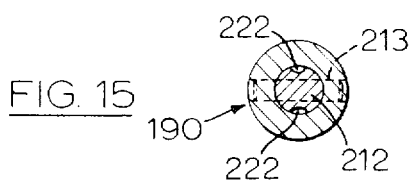
FIG. 15 is a sectional view along lines 15—15 of FIG. 14.

If desired, the gate insert 190 may be fitted with a torpedo 212, as shown in FIGS. 14, 15. The torpedo 212 has an elongated cylindrical body which is slid into the gate insert and fits snugly therein. The torpedo 212 is held in position by a pin 213 which is inserted through one of two diametrically opposed holes 214 in the wall of the gate insert 190 into a corresponding diammetrical hole 216 in the torpedo. The pin 213 is prevented from falling out by the walls of the hot runner tubing 190 into which the gate insert 190 is inserted.

When in position, the torpedo 212 has a pointed tip 218 which enters the gate opening 202 to restrict this opening to the desired size. If desired, the tip 218 can be slightly off the axis of the torpedo to create a non-symmetrical flow, and the gate insert with the torpedo can be rotated inside the hot runner to utilize the non-symmetrical properties of the flow to optimum extent. The opposite tip 220 of the torpedo is also pointed, to allow smooth flow of plastic around it.

The torpedo 212 contains one or more longitudinal channels 222 to allow plastic flow through the gate insert. (Two channels 222 are shown in FIG. 15). The channels 222 are of calibrated size, depending on the type of plastic being injected. When the type of plastic injected is changed, the torpedo 212 can easily be replaced by another torpedo having appropriate size channels 222.

It will be apparent that the runner tubing 192 shown in FIGS. 13 to 15 may be part of the hot runner 24 of FIG. 1, the gate insert structure of FIGS. 13 to 15 thus replacing the stem 48 and gate 26 of FIG. 1.

What I claim as my invention is:

1. For a plastic injection mold structure, a hot runner system comprising: a first member located in said mold structure, said first member having a first bore therein of predetermined length; a second member adapted to be located in said mold structure at a position spaced from said first member; a runner member for conducting molten plastic between said first and second members, said runner member having a first tubular end, and a second end adapted to be connected to said second member; a heater coupled to said runner member between said ends to heat said plastic flowing through said runner member; said first end of said runner member being in its entirety adapted to be snugly but slidably fitted into said first bore and having a first portion of length normally less than said predetermined length located in said first bore and a second portion projecting from said first bore, so that when said runner member is heated and expands in a direction parallel to the axis of said first end, said first end of said runner member will slide into said first bore to accommodate such expansion in said direction; said runner member comprising a pair of runner portions oriented at right angles to each other and joined by an integral right angle bend.

2. Apparatus according to claim 1 wherein said runner portions are substantially tubular and are separated by air gaps from said mold structure over a substantial portion of their length, to reduce heat transfer from said runner member to said mold structure.

3. Apparatus according to claim 2 including a mounting portion connected to said bend of said runner member and adapted to be connected to said mold structure for supporting said runner member.

4. Apparatus according to claim 1 wherein said first member is a sprue bushing and said second member is a cavity member having a gate therein for directing plastic into a mold cavity of said mold structure, and wherein at least said first end of said runner member has a thermal coefficient of expansion greater than the thermal coefficient of expansion of said sprue bushing.

5. Apparatus according to claim 1 wherein said second end of said runner member is tubular, and including a movable stem member slidably mounted at said second end of said runner member, and projecting therefrom, said stem member having an interior passage for plastic and being movable axially of said second end between a first closed position in which it blocks egress of molten plastic from said second member and a second open position in which it permits egress of molten plastic from said second member.

6. Apparatus according to claim 5 wherein said second member includes a gate therein, said stem member being slidably mounted in said second end, said stem member having a circumferential radially outwardly extending collar, with an elongated closure portion projecting axially from said collar towards said gate, said collar and said elongated portion of said stem member defining with said second member at least a portion of a chamber for plastic, said chamber being closed by said elongated portion blocking said gate when said stem member is in said closed position, the diameter of said collar being such that the area on which plastic presses to move said stem member to said open position is greater than the area on which plastic presses to move said stem member to said closed position, and spring means biasing said stem member to said closed position with preselected pressure, said pressure being such that said stem member will move against the pressure of said spring means to its open position when the pressure of said plastic increases beyond a predetermined level.

7. Apparatus according to claim 5 wherein said stem member is snugly but slidably mounted in said second end, said second end including a pair of holes in its wall substantially sealed against escape of plastic by said snug fit of said stem member therein, said apparatus further including a pair of pins connected to said stem member and protruding through said holes in said second end, a cylindrical piston encircling said second end and connected to said pins, a cylinder encircling and guiding said piston, said piston having a central collar sliding against said cylinder, and means for admitting pressurized fluid to said cylinder on either side of said collar and for removing fluid from said cylinder on the other side of said collar to drive said piston.

8. Apparatus according to claim 7 wherein said stem member is of a material of very high thermal conductivity.

9. Apparatus according to claim 4 including a stem member mounted in said second end of said runner member, said stem member having an interior passage directing plastic into said gate, said stem member being of a material of very high thermal conductivity.

10. Apparatus according to claim 9 wherein said stem member has a substantially cylindrical portion housed in said second end of said runner member, and a narrowed tip, with a substantially radial wall between said cylindrical portion and said tip, said interior passage comprising an axial bore extending part way into said cylindrical portion, and a plurality of smaller passages extending from said axial bore to said radial wall, said smaller passages being spaced around said radial wall.

11. For a plastic injection mold structure: a tubular member for conducting plastic, said tubular member having an end adapted to be snugly but slidably fitted into a bore in said structure to receive plastic from or deliver plastic to said bore, and a thin cylindrical sleeve at said end projecting from said member, said sleeve being flexible and being joined to said member and having a first portion overlying said member and a second portion projecting from said member, at least a substantial part of said second portion being of diameter equal to a very slightly larger than that of said bore and at least a substantial part of said first portion being of diameter very slightly less than that of said bore, whereby to create a slidable seal between said tubular member and said bore while minimizing heat transfer between said tubular member and said bore.

12. Apparatus according to claim 11 wherein all of said first portion and a small part of said second portion adjacent said first portion is of diameter slightly less than said bore.

13. Apparatus according to claim 12 wherein said sleeve is of hardened steel and is fastened to said tubular member by silver solder.

14. Apparatus according to claim 12 wherein the diameter of said second portion is approximately in the range between the same diameter as that of said bore and .002 inches larger than the diameter of said bore.

15. Apparatus according to claim 12 wherein said tubular member is a hot runner member.

16. For a plastic injection mold structure of the type including a cavity plate and a mold cavity bounded at least in part by said cavity plate, the improvement comprising a hot runner member having a first end part adapted to receive plastic and an elongated tubular second end part adapted to discharge plastic, means mounting said second end part in a position spaced from said cavity plate by an air gap so that said second end part is free to expand and contract relative to said cavity plate, a substantially cylindrical gate insert member having a first end portion snugly but slidably fitted into said second end part of said runner member and a second end portion projecting from said second end part of said runner member, said gate insert member having a passage therein to conduct plastic from said runner member to said second end portion of said gate insert member, said second end portion of said gate insert member having an end fitted snugly into said cavity plate and having a gate aperture therein to direct plastic through said cavity plate into said mold cavity, the part of said second end portion immediately adjacent said second end part of said hot runner member also being snugly slidable in said second end part of said runner member, so that said second end part of said runner member can slide over said gate insert member as said second end part of said runner member expands and contracts with changes in temperature.

17. Apparatus according to claim 16 wherein said passage is a straight axial passage through said gate insert member to said gate aperture, said gate aperture being located slightly off the axis of said gate insert member.

18. Apparatus according to claim 16 wherein said passage is a straight axial passage through said gate insert member to said gate aperture, said apparatus further including a torpedo snugly but slidably fitted into said passage, said torpedo having a narrowed tip cooperating with said gate aperture to control flow of plastic through said gate aperture, said torpedo also having calibrated passages therein to control flow of plastic past said torpedo, and a pin inserted through the walls of said first end portion of said stem member and through said torpedo to retain said torpedo in said gate insert member.

19. Apparatus according to claim 16 wherein said second end portion of said gate member includes an external circumferential collar therearound, said apparatus further including spring means fitted between said collar and said second end of said runner member to bias said gate member against said mold cavity plate.

20. Apparatus according to claim 19 including retaining means for retaining said gate insert member in said second end part of said runner member and for limiting sliding movement of said gate insert member within said second end part of said runner member, said retaining means comprising a circumferential groove in said first end portion, and a set screw projecting through the wall of said runner member into said groove, said groove being wider than the width of the end of said set screw to allow said limited sliding movement of said gate insert member.

21. Apparatus according to claim 20 wherein said set screw projects above the wall of said runner member, the exterior surface of said runner member being adapted to receive a heater, the projecting end of said set screw being adapted to locate the end of said heater.

22. Apparatus according to claim 21 wherein said spring means is a circular disk spring.

23. For a plastic injection mold structure of the type including a cavity plate having a gate aperture, and a mold cavity bounded at least in part by said cavity plate and into which said gate aperture opens, the improvement comprising: a hot runner member having a first end adapted to receive plastic and a tubular second end adapted to discharge plastic, a substantially cylindrical stem member having a first end portion snugly but slidably fitted into said second end of said runner member and a second end portion projecting from said second end of said runner member, means retaining said stem member in said second end of said runner member, said stem member having a passage therein to conduct plastic from said runner member to said second end portion of said stem member, said stem member being a valve member and said second end portion of said stem member having an end adapted to cooperate with said cavity plate to direct plastic through said gate aperture into said mold cavity, said stem member forming part of a plastic pressure operated valve and being axially movable between a first position in which said end of said second end portion blocks passage of plastic through said gate aperture and a second position in which said end of said second end portion is withdrawn from said gate aperture to permit passage of plastic therethrough, said first end portion of said stem member having a circumferential radially outwardly extending collar, said collar having an end face defining with said cavity member at least a portion of a chamber for plastic, with said gate aperture in said chamber and said end face closing the end of said chamber remote from said gate aperture, the diameter of said collar being such that the area on which plastic presses to move said stem member to said open position is greater than the area on which the plastic presses to move said stem member to said closed position, and spring means biasing said stem member to said closed position with preselected pressure, said pressure being such that said member will move against the pressure of said spring means to its open position when the pressure of said plastic increases beyond a predetermined level.

24. Apparatus according to claim 23 wherein said stem member includes a circumferential groove in its exterior surface, said groove being located in said first end portion of said stem member, said runner member having a pair of diametrically opposed slots in its wall over said groove, and a pair of diammetrically opposed springs disposed within said slots and pressing against a wall of said groove to bias said stem member into closed position, said groove being wider than said slots, said springs having outturned ends fitted between said groove and the interior surface of said second end of said runner member to retain said springs in position.

25. Apparatus according to claim 23 wherein said second end of said runner member has an end surface defining a portion of said chamber, said second end including a seal at its said end surface to seal against said cavity plate.

26. Apparatus according to claim 23 wherein said passage in said stem member includes an axial bore extending from that end of said stem member located within said hot runner tubular member, and a plurality of smaller passages extending from said axial bore through said collar into said chamber, said smaller passages being spaced around said collar.

27. Apparatus according to claim 26 wherein said passages are three in number and are spaced at 120° intervals around said collar.

28. For a plastic injection mold structure of the type including a cavity plate having a gate aperture, and a mold cavity bounded at least in part by said cavity plate and into which said gate aperture opens, the improvement comprising a hot runner member having a first end adapted to receive plastic and a tubular second end adapted to discharge plastic, a substantially cylindrical stem member having a first end portion snugly but slidably fitted into said second end of said runner member and a second end portion projecting from said second end of said runner member, means retaining said stem member in said second end of said runner member, said stem member having a passage therein to conduct plastic from said runner member to said second end portion of said stem member, said stem member being a valve member and said second end portion of said stem member having an end adapted to cooperate with said cavity plate to direct plastic through said gate aperture into said mold cavity, said stem member being axially movable between a first position in which said end of said second end portion blocks passage of plastic through said gate aperture and a second position in which said end of said second end portion is withdrawn from said gate aperture to permit passage of plastic therethrough, the wall of said runner member adjacent said second end including a pair of holes therein substantially sealed against escape of plastic by the snug fit of said first end portion of said stem member in said second end of said runner member, said apparatus further including a pair of pins connected to said stem member and protruding through said holes in said runner member, a cylindrical piston encircling said second end of said runner member and connected to said pins, a cylinder encircling and guiding said piston, said piston having a central collar sliding against said cylinder, and means for admitting pressurized fluid to said cylinder on either side of said collar and for removing fluid from said cylinder on the other side of said collar to drive said piston.

29. For a plastic injection mold structure, a hot runner system comprising: a first member located in said mold structure, said first member having a first bore therein of predetermined length; a cavity plate located in said mold structure at a position spaced from said first member; a hot runner for conducting molten plastic between said first member and said cavity plate, said hot runner comprising first and second tubular runner members oriented at right angles to each other, and separated from said mold structure and from said cavity plate by air gaps over a substantial portion of their length, and a connecting portion joining said runner members; heater means connected to said runner members to heat plastic flowing through said runner members; said first runner member having a tubular end adapted to be snugly but slidably fitted in its entirety into said first bore and having a first portion of length normally less than said predetermined length located in said first bore and a second portion projecting from said first bore, so that when said runner member is heated and expands in a direction parallel to the axis of said first end, said first end of said runner member will slide into said first bore to accommodate such expansion in said direction; said second runner member having a tubular second end adapted to discharge plastic; means mounting said connecting portion to said mold structure to support said second runner member with said second end spaced from said cavity plate by an air gap so that said second runner member can expand and contract relative to said cavity plate; and means providing a sliding sealed connection between said second end of said second runner member and said cavity plate for allowing expansion and contraction of said second runner member relative to said cavity plate, in a direction parallel to the axis of said second runner member.

30. Apparatus according to claim 29 wherein said means providing a sliding sealed connection comprises: a substantially cylindrical gate insert member having a first end portion snugly but slidably fitted into said second end of said second runner member and a second end portion projecting from said second end of said second runner member, said gate insert member having a passage therein to conduct plastic from said runner member to said second end portion of said gate insert member, said second end portion of said gate insert member having an end fitted snugly into said cavity plate and having a gate aperture therein to direct plastic through said cavity plate into said mold cavity, the part of said second end portion immediately adjacent said second end of said second runner member also being snugly slidable in said second end of said second runner member, so that said second end of said second runner member can slide over said gate insert member as said second runner member expands and contracts with changes in temperature.

31. A plastic injection mold structure having a cavity plate and a mold cavity bounded at least in part by said cavity plate, said cavity plate having an enlarged aperture therein opening into said mold cavity; said structure further including a hot runner member adapted to receive plastic, said hot runner member having an elongated tubular portion having an end adapted to discharge said plastic; means mounting said tubular portion in a position spaced from said cavity plate by an air gap; a substantially cylindrical discrete gate insert member having a first and second end, a gate aperture at said first end and a passage communicating from said second end to said gate aperture; said gate insert member extending from said end of said tubular portion into said enlarged aperture in said cavity plate, with said first end being located in said enlarged aperture, and said gate insert member forming with said end of said tubular portion and said cavity plate a sliding sealed connection for conducting plastic from said tubular portion into said mold cavity while permitting substantially free axial expansion and contraction of said tubular portion.

* * * * *